(12) United States Patent
Li et al.

(10) Patent No.: US 11,556,880 B1
(45) Date of Patent: Jan. 17, 2023

(54) SENTIMENT-BASED PRIORITIZATION OF CONTACT CENTER ENGAGEMENTS

(71) Applicant: Zoom Video Communications, Inc., San Jose, CA (US)

(72) Inventors: Jin Li, Los Gatos, CA (US); Xu Hua Li, San Jose, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/589,216

(22) Filed: Jan. 31, 2022

(51) Int. Cl.
| | |
|---|---|
| *G06Q 10/06* | (2012.01) |
| *G10L 25/63* | (2013.01) |
| *H04M 3/51* | (2006.01) |
| *G10L 15/08* | (2006.01) |
| *H04M 3/493* | (2006.01) |
| *G10L 15/18* | (2013.01) |

(52) U.S. Cl.
CPC . *G06Q 10/06393* (2013.01); *G06Q 10/06398* (2013.01); *G10L 15/1815* (2013.01); *G10L 25/63* (2013.01); *H04M 3/4936* (2013.01); *H04M 3/5175* (2013.01); *H04M 3/5183* (2013.01); *G10L 2015/088* (2013.01); *H04M 2201/40* (2013.01); *H04M 2201/42* (2013.01); *H04M 2203/401* (2013.01)

(58) Field of Classification Search
CPC ........ G06Q 10/06393; G06Q 10/06398; G10L 25/63; G10L 2015/088; H04M 3/5175; H04M 2203/401
USPC ..................... 705/7.39, 7.38, 7.41, 7.42, 7.11
See application file for complete search history.

(56) References Cited

U.S. PATENT DOCUMENTS

| | | | |
|---|---|---|---|
| 10,044,865 | B2 | 8/2018 | Dumaine et al. |
| 10,462,300 | B2 | 10/2019 | Dumaine et al. |
| 10,601,991 | B1 | 3/2020 | Braddick |
| 10,771,626 | B1 | 9/2020 | Braddick |
| 10,839,335 | B2 | 11/2020 | Weisman et al. |
| 10,860,807 | B2 | 12/2020 | Ni et al. |
| 2014/0188457 | A1* | 7/2014 | Fink .................. G06F 40/30 704/9 |
| 2014/0188459 | A1* | 7/2014 | Fink .................. G06F 40/30 704/9 |
| 2021/0005217 | A1 | 1/2021 | Deole et al. |
| 2021/0158235 | A1 | 5/2021 | Sivasubramanian et al. |

* cited by examiner

*Primary Examiner* — Thjuan K Addy
(74) *Attorney, Agent, or Firm* — Young Basile Hanlon & MacFarlane, P.C.

(57) ABSTRACT

A sentiment-based score is determined for a contact center engagement between a first contact center service operator and a contact center user. The sentiment-based score is indicated within a graphical user interface displaying information associated with multiple contact center engagements at a device of a second contact center service operator. Based on a request to participate in the contact center engagement received from the device of the second contact center service operator via the graphical user interface, information associated with the contact center engagement is transmitted to the device of the second contact center service operator, and a contact center session involving a device of the contact center user and the device of the second contact center service operator is established.

20 Claims, 8 Drawing Sheets

SENTIMENT-BASED PRIORITIZATION OF CONTACT CENTER ENGAGEMENTS

FIELD

This disclosure generally relates to sentiment-based prioritization of contact center engagements.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
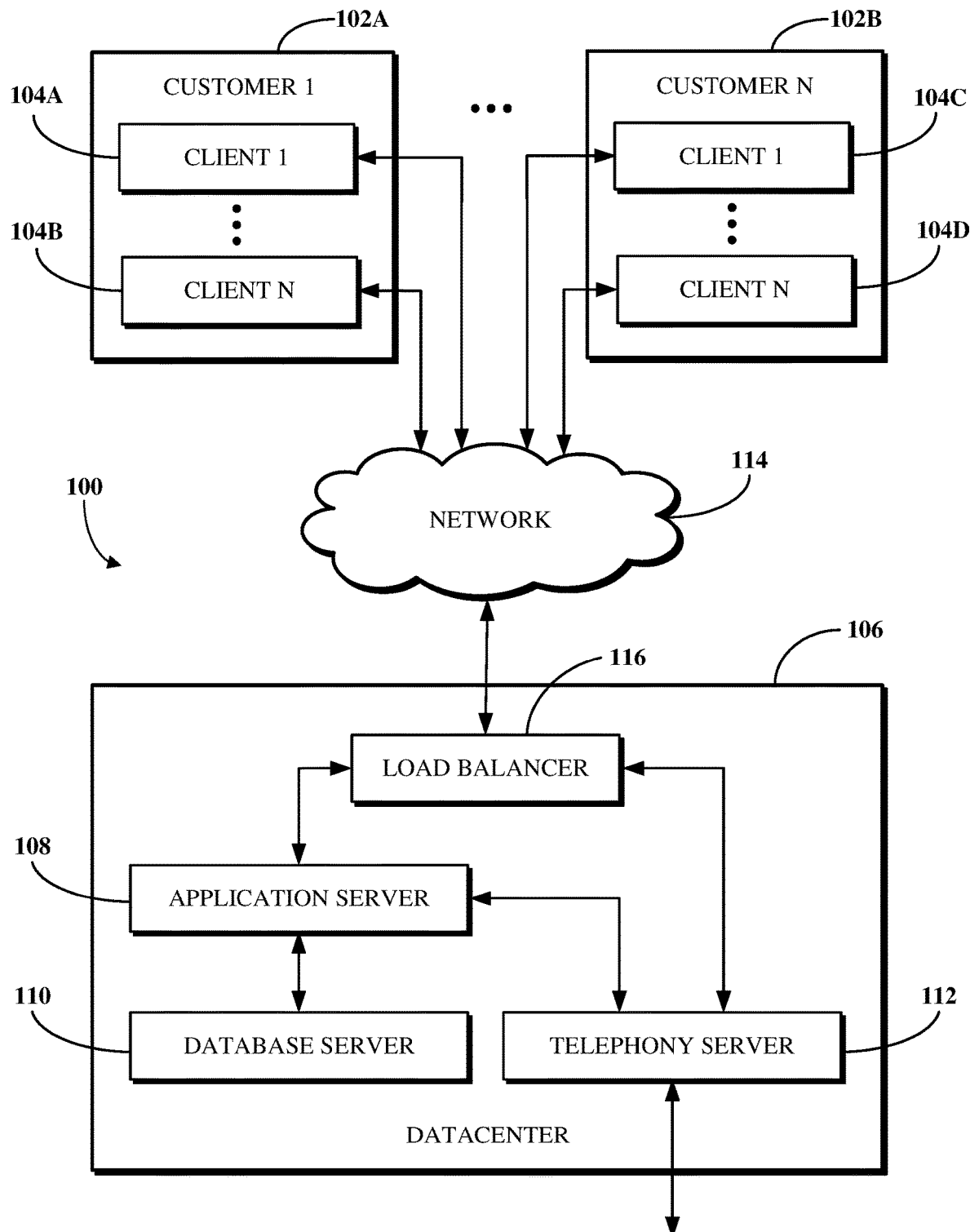
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

Customer support requests are addressed within a contact center over contact center engagements between contact center users and contact center agents. A contact center engagement may include a number of interactions between the subject user and the subject agent, for example, questions or statements communicated from one to the other. To ensure that contact center users are receiving high quality service from contact center agents, a contact center may be configured using one or more real-time analytics tools. Some conventional real-time analytics tools for contact center engagements may, for example, allow a supervisor assigned to an agent group to view a list with information associated with active engagements with agents of the agent group at a given time. Such conventional tools may, for example, provide some visual representation of the active engagements to the supervisor within a list format, who can manually navigate between them individually to view certain information about those engagements.

An important measure of user satisfaction and thus quality of service for a contact center engagement is sentiment. For example, sentiment may refer to the expected feeling of the contact center user based on the words and/or expressions of the contact center user and/or of the contact center agent during the engagement. To understand a current sentiment measure for a given engagement and thus what is actually happening within that engagement, a supervisor using conventional real-time analytics tools must leave the visual list representation of the many active engagements by randomly selecting individual contact center engagements, one at a time. Alternatively, a contact center agent of the agent group may manually pass a message to the supervisor to ask the supervisor to pay attention to a certain engagement. In either case, the supervisor is limited to focusing his or her attention on a single engagement. As a consequence, important interaction information for other contact center engagements may be entirely missed by the supervisor, or the supervisor may otherwise be materially delayed in addressing such interaction information. Such delays or misses may ultimately have a considerable negative effect on customer satisfaction.

Even where a supervisor focuses his or her attention on a contact center engagement which requires his or her participation, the supervisor may have to participate without access to important or relevant information about the contact center engagement, and thus without understanding the context behind a current sentiment for an engagement. In particular, conventional real-time analytics tools may not monitor or obtain such information due to their limited capabilities in tracking end-to-end user journey information in real-time. As such, the supervisor may rely upon the subject agent to pass long information about the engagement so the supervisor understands the nature of the contact center user's concerns. However, this process may require placing the contact center user on hold for an extended period of time after the user has already waited for some amount of time in a queue to reach the agent, and may therefore frustrate the user, leading to a negative effect on customer satisfaction.

Implementations of this disclosure address problems such as these using sentiment-based prioritization for contact center engagements. A sentiment-based score is determined for a contact center engagement between a first contact center service operator (e.g., a human or non-human agent) and a contact center user. The sentiment-based score is indicated within a graphical user interface displaying information associated with multiple contact center engagements at a device of a second contact center service operator (e.g., a human agent or supervisor). Based on a request to participate in the contact center engagement received from the device of the second contact center service operator via the graphical user interface, information associated with the contact center engagement is transmitted to the device of the second contact center service operator, and a contact center session involving a device of the contact center user and the device of the second contact center service operator is established.

In an example use case for sentiment-based prioritization for a contact center engagement, software used with or for the contact center determines a sentiment-based score for a contact center engagement between a user and an agent. The sentiment-based score may, for example, be a value which is updated based on some or all interactions during the engagement. At some point during the engagement, the sentiment-based score may meet or exceed a threshold representing a value at which supervisor participation in the engagement is requested or required. At that time, a graphical user interface output at a device of the supervisor indicates an alert in connection with the engagement. User interface elements associated with the alert enable the supervisor to immediately view information associated with the contact center engagement (e.g., a summary of some or all of the interactions thereof, such as which may be synthesized using natural language processing of a real-time transcription of the contact center engagement) and to request to participate in the engagement in one or more ways. Ways in which the supervisor may request to participate in the engagement include: monitoring the engagement in real-time, such as by listening into the engagement without communicating with the contact center user or the contact center agent; communicating with the contact center agent over one or more modalities, which may be the same as or different from the modality over which the contact center engagement is facilitated, without joining the engagement itself; and joining the engagement to enable the supervisor to actively communicate with the contact center user over a session established to involve the device of the supervisor and the device of the user, either with the original agent still on the line or removed from the communications. Where there are multiple contact center engagements for which alerts are presented to the supervisor, the engagements may be ranked according to a sentiment-based prioritization determined for the engagements, such as based on a comparison of the sentiment-based scores determined for each.

To describe some implementations in greater detail, reference is first made to examples of hardware and software structures used to implement a system for sentiment-based prioritization of contact center engagements. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
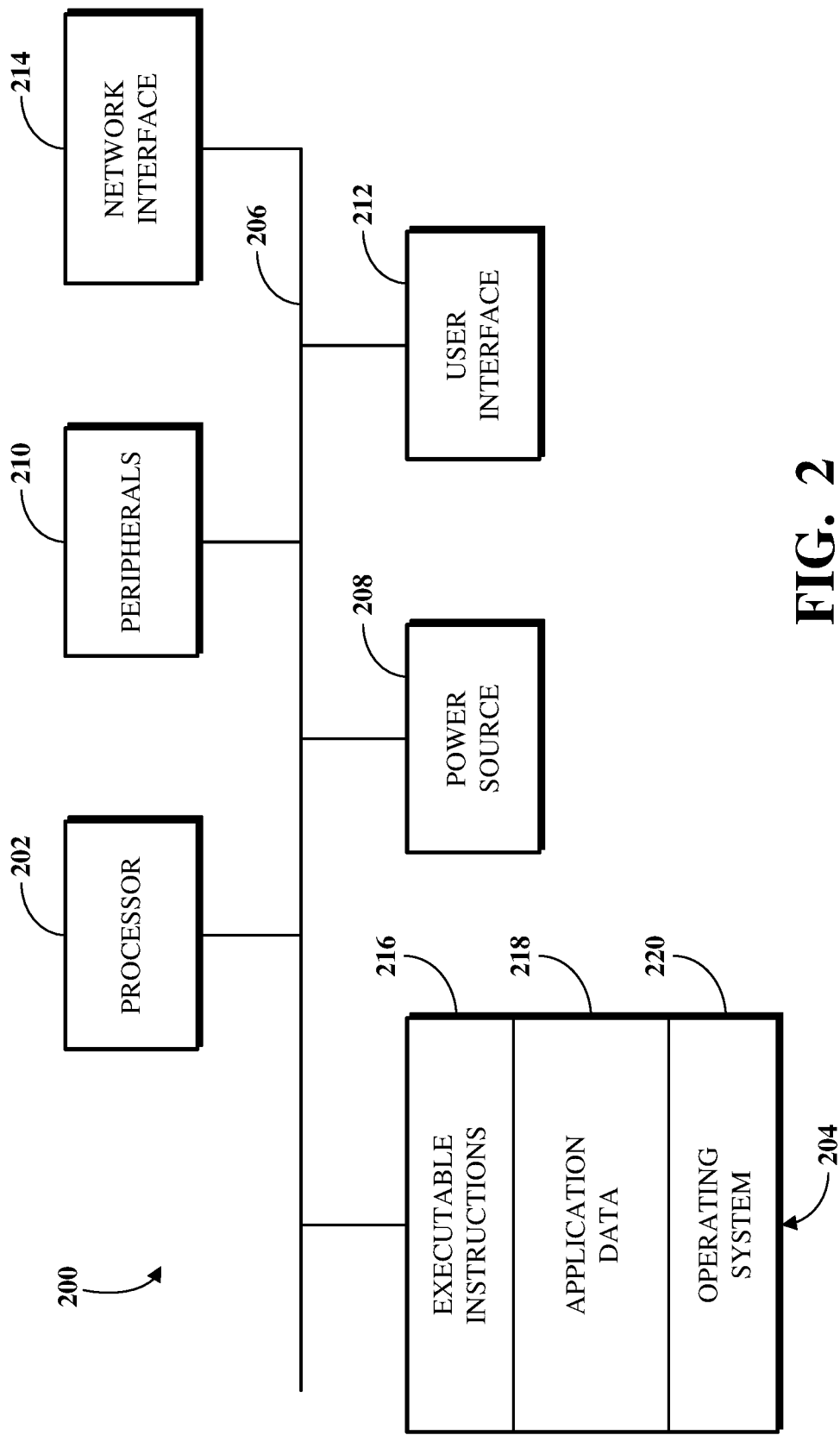
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
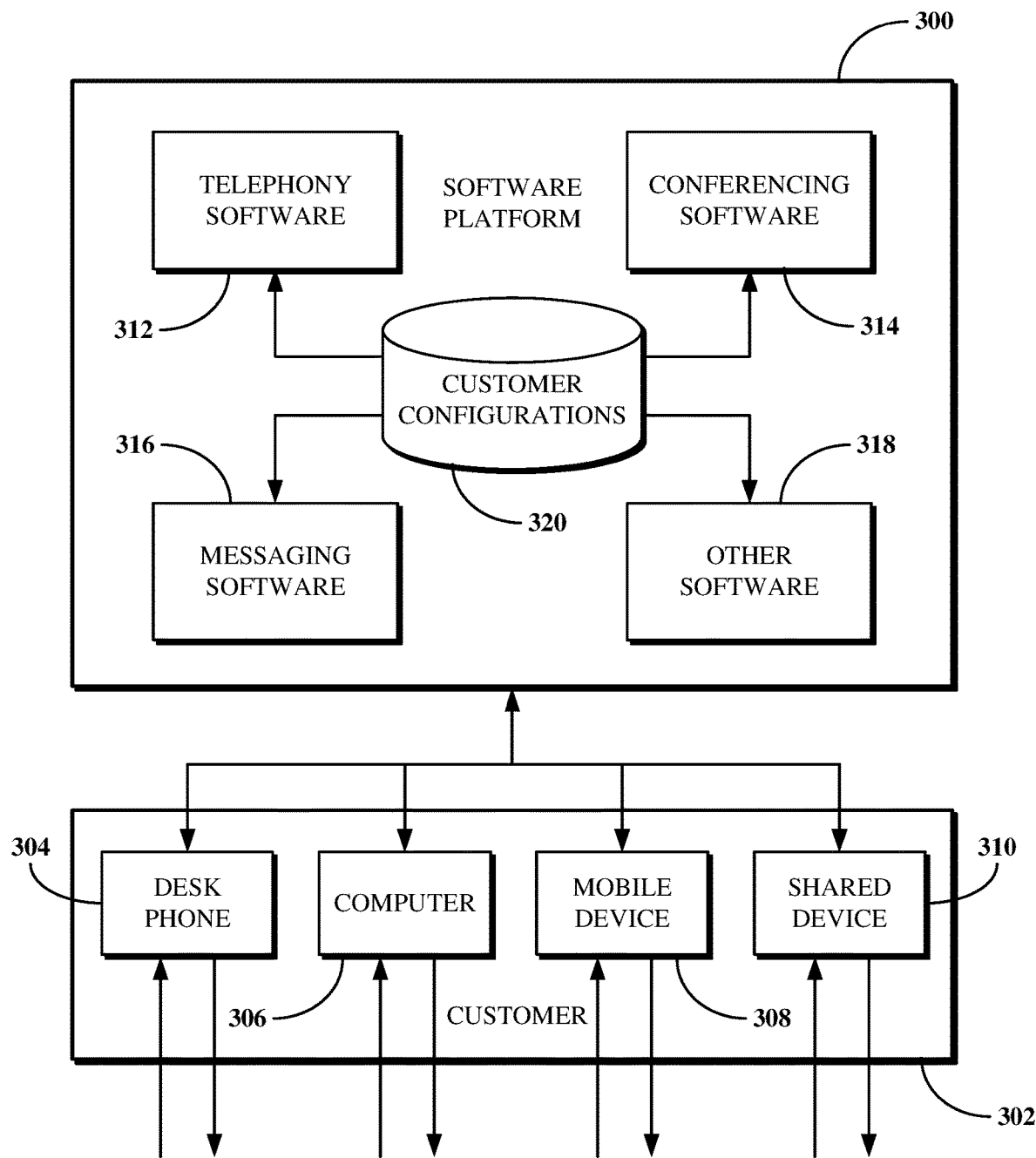
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for use with a contact center system, for example, for sentiment-based prioritization of contact center engagements.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
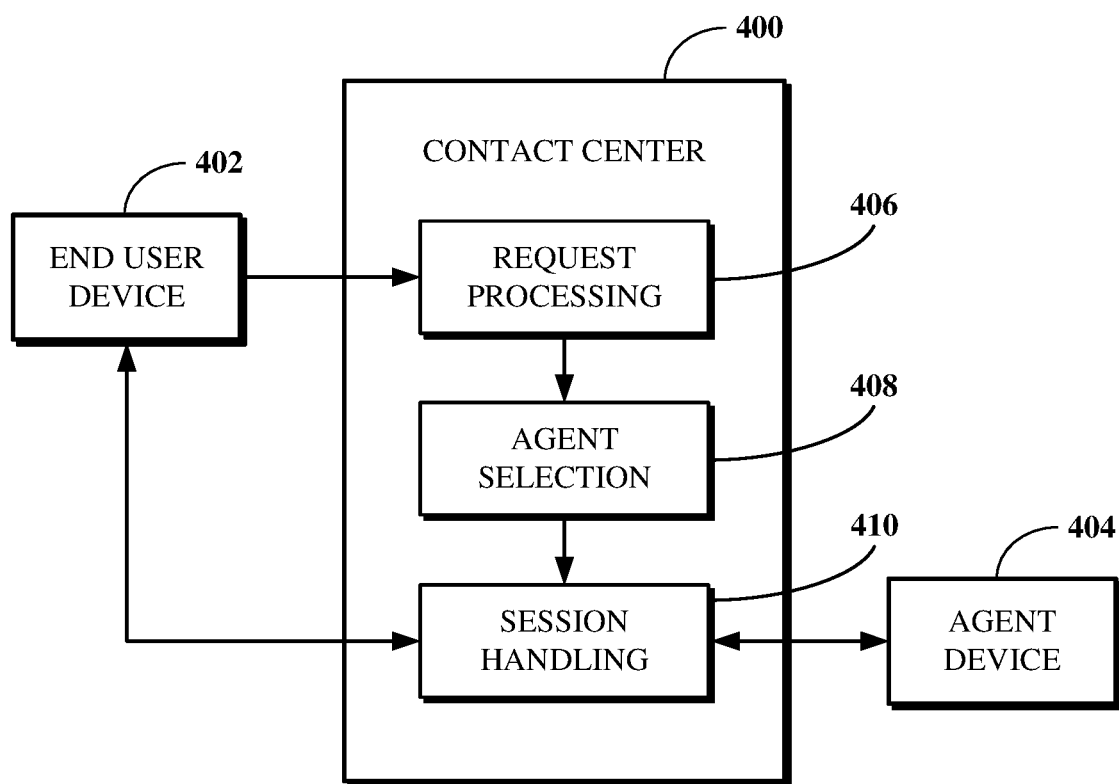
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or subcategory of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request via text and thereafter process the text entered by the user device 402 using natural language processing and/or other processing.

The agent selection software 408 uses output of the request processing software 406 including the information associated with the request to select a contact center agent to handle the request. The contact center agent may be a human agent or a non-human agent, for example, a chat bot or other bot. The agent selection software 408 may first determine an agent group associated with the category or sub-category of the purpose of the request (e.g., based on the information associated with the request). The agent selection software 408 may thereafter select an agent from that agent group based on one or more criteria, including agent skill set, agent availability, an agent selection policy (e.g., indicating to rotate in a particular way through a list of available agents), agent review scores, a combination thereof, or the like.

Generally, an agent may belong to one agent group and be able to facilitate requests over one modality. For example, a contact center agent may only be part of an agent group that handles information technology-related requests over the telephony modality. However, in some cases, a given agent may belong to multiple agent groups and/or be able to facilitate requests over one or more modalities. For example, a contact center agent may be part of a first agent group that handles accounting-related requests over all of the telephony, video, chat, text, and social media modalities. In another example, a contact center agent may be part of a first agent group that handles accounting requests over the telephony modality and part of a second agent group that handles information technology-related requests over the video modality. Generally, the agent selected by the agent selection software 408 will automatically be assigned the contact center engagement with the user device 402. However, in some implementations, the agent selection software 408 instead may prompt the selected agent to accept the contact center engagement with the user device 402 before assigning that contact center engagement to the selected agent.

The session handling software 410 establishes a connection for a session between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software. The session handling software 410 may facilitate a contact center engagement including by determining a sentiment-based score for the engagement and alerting a contact center operator, such as an agent or supervisor, regarding the sentiment-based score or a prioritization thereof based on the score meeting or exceeding a threshold.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
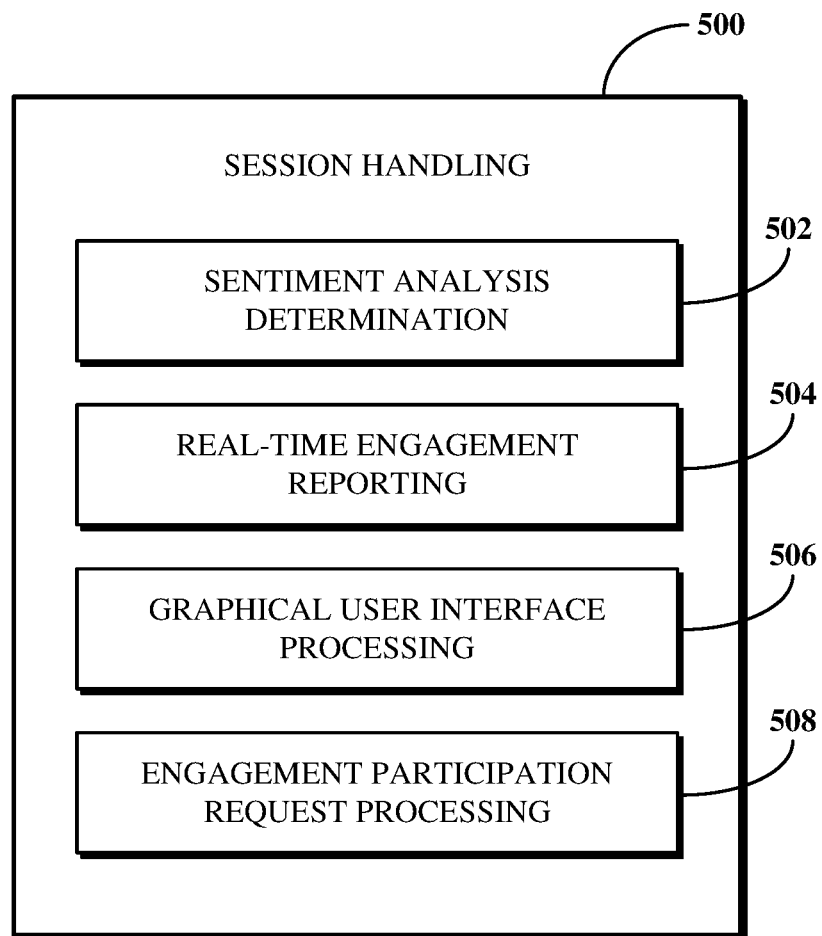
FIG. 5 is a block diagram of example functionality of session handling used for sentiment-based prioritization of contact center engagements.

FIG. 5 is a block diagram of example functionality of session handling software 500 used for sentiment-based prioritization of contact center engagements. The session handling software 500 may, for example, be the session handling software 410 shown in FIG. 4. The session handling software 500 includes tools, such as programs, subprograms, functions, routines, subroutines, operations, and/or the like for sentiment-based prioritization of contact center engagements. As shown, the session handling software 500 includes a sentiment analysis determination tool 502, a real-time engagement reporting tool 504, a graphical user interface processing tool 506, and an engagement participation request processing tool 508.

The sentiment analysis determination tool 502 determines sentiment-based scores for contact center engagements between contact center users and contact center operators, such as human or non-human agents (e.g., chatbots). A sentiment-based score represents a measure of sentiment for a contact center engagement. A measure of sentiment for a contact center engagement generally refers to or otherwise indicates a feeling of the subject contact center user based on the words and/or expressions of the subject contact center user and/or of the contact center agent during the engagement. The sentiment-based score is a value determined to represent that measure of sentiment using contextual processing of a conversation between the user and agent occurring during the engagement.

There may be many modeled approaches which may be used to determine the sentiment-based score. For example, various variables may be defined according to linguistic, contextual, and like modeling to weight the relative value of certain words, tones, inflections, phrases, pauses, speech volumes, speech speeds, or the like or a combination thereof, either on their own or in a specific context of use (e.g., based on neighboring words or phrases). In some cases, a model used to determine a sentiment-based score for a contact center engagement may change over time, such as based on learned understandings of idiosyncrasies or other language or expression perception specific to one or more contact center users and/or agents.

A sentiment-based score may be determined for a contact center engagement at one or more times during the contact center engagement. For example, a sentiment-based score may be determined based on triggering events detected during the engagement, such as based on certain words (e.g., profane language) or tones (e.g., inflections perceived by modeling to be associated with anger or frustration). In another example, a sentiment-based score may be determined based on some or all interactions during the contact center engagement regardless of the specific sentiment associated with those interactions. In some such cases, the sentiment-based score may be considered to be determined for each such interaction. In other such cases, the sentiment-based score may be considered to be determined for a first such interaction and then updated based on each subsequent such interaction. In yet another example, a sentiment-based score may be determined at predetermined or other times during the contact center engagement, such as once every thirty seconds or once per minute.

In some cases, where a record of a prior contact center engagement for the same contact center user is available within the contact center system, an initial value of the sentiment-based score for the current contact center engagement involving the user is based on a last or other sentiment-based score determined during that prior contact center engagement. In this way, the sentiment analysis may follow the contact center user across multiple contact center engagements. This may be particularly useful to prioritize engagements with that user for participation by another agent or supervisor, such as where the initial value determined based on that recent prior contact center engagement indicates or otherwise corresponds to a relatively low customer satisfaction of that user. In other cases, such as where the contact center user is a first-time user of the contact center or otherwise, an initial value of the sentiment-based score may simply be the first sentiment-based score determined for the contact center engagement.

The real-time engagement reporting tool 504 reports information associated with active contact center engagements in real-time to an agent or supervisor device. The information which may be reported by the real-time engagement reporting tool includes sentiment-based scores determined by the sentiment analysis determination tool 502, alerts presented based on comparisons of such sentiment-based scores against a threshold, summaries of portions or all of one of more of the active contact center engagements, or the like. For example, for a given contact center engagement, the real-time engagement reporting tool 504 may present the most recent sentiment-based score determined therefor, an alert where that sentiment-based score meets or exceeds a threshold defined for sentiment prioritization, and a summary of one or more recent interactions during the engagement that lead to that sentiment-based score being determined or which are otherwise associated with that sentiment-based score.

The threshold used for determining whether to present an alert for a given contact center engagement represents a sentiment-based score value that, when met or exceeded, indicates a need to prioritize attention to that engagement. The threshold may have a default value for some or all contact center engagements across agent groups. In some cases, however, an agent group supervisor, administrator, or other person or entity (e.g., software of or otherwise used by the contact center system) may define the threshold, for example, based on quality metrics required for a given agent group or the contact center as a whole. In some cases, the threshold may change over time, such as based on numbers of contact center engagements which have sentiment-based scores that are determined to meet or exceed an initial value of that threshold. In some cases, the threshold may be defined for some or all contact center users, individually, in which case changes to the threshold for a given user may be made during or after a given contact center engagement involving that user. In some implementations, threshold may represent a period of time over which to compare one or more sentiment-based scores determined for a given contact center engagement. For example, the threshold may be considered to be met or exceeded where current sentiment-based scores for a given contact center engagement continuously meet or exceed some value defined for the threshold for that defined period of time during the engagement.

The information associated with a given contact center engagement may be reported to an agent or supervisor device in one or more ways. In some cases, the information may be reported in the form of a message transmitted to the agent or supervisor device, such as via a client application or other software running thereat. For example, the message may be a chat message, an email message, a text message, a social media message or post, or another in-application message. In some cases, as will be further discussed below with respect to the graphical user interface processing tool 506, the information may be reported within a graphical user interface output for display at the agent or supervisor device. For example, the graphical user interface may include a visualization of active contact center engagements and the reported information may be output for display within that graphical user interface in connection with the corresponding engagements.

The graphical user interface processing tool 506 generates and/or processes a graphical user interface which may be output for display at an agent or supervisor device to view information associated with one or more active contact center engagements and corresponding information reported by the real-time engagement reporting tool 504. The graphical user interface may, for example, be a graphical user interface of a client application, a web application, or other software usable by contact center agents and/or supervisors. In some cases, the graphical user interface may be implemented within a widget or panel output for display at the agent or supervisor device, such as in a window separate from a window of a software application which provides the information output at the graphical user interface. Regardless of the particular format, the graphical user interface processing tool 506 updates the graphical user interface during the active engagements to present real-time data for agents or supervisors.

The graphical user interface includes information associated with one or more active contact center engagements and, as applicable, information reported by the real-time engagement reporting tool 504. For example, the graphical user interface may, for each active engagement, include information indicating at least one of a direction of the communication (e.g., whether the engagement was initiated by an inbound request from the contact center user or an outbound request to the contact center user), a name or other identifier of the contact center user and/or a contact center customer with which the user is associated (e.g., a company name where the user is an employee of the company), a name or other identifier of the contact center agent involved in the engagement, a name or other identifier of a queue within which the user is or was placed as part of the engagement routing, or a start time and date of the engagement.

The graphical user interface may further, for each active engagement, include one or more interactive user interface elements which enable the agent or supervisor viewing the graphical user interface to participate in the engagement. For example, a first user interface element may correspond to an action enabling the agent or supervisor to monitor the engagement, a second user interface element may correspond to an action enabling the agent or supervisor to communicate with the current agent, and a third user interface element may correspond to an action enabling the agent or supervisor to join the engagement, such as to replace the current agent or to join as a third party alongside the current agent.

Moreover, the graphical user interface may, for each active engagement, include an alert element for reporting a sentiment-based score determined for the engagement and/or for indicating that the score meets or exceeds a threshold, as discussed above. In some cases, the alert element may be color-coded to indicate a range (e.g., good, neutral, or bad) for the score. In some cases, the alert element may be emphasized (e.g., bolded, enlarged, flashing, or highlighted) based on the score meeting or exceeding the threshold. In some cases, information associated with the contact center engagement may be displayed in connection with an alert element. For example, the information displayed in connection with an alert element may include or indicate at least one of a summary of one or more interactions associated with the score corresponding to the alert element, a summary of past contact center engagements for the subject contact center user, a length of time that the score has met or exceeded the threshold, or a priority designation (e.g., ranking) for the engagement compared to others. The alert element thus visually identifies the engagements which require agent or supervisor attention right on the graphical user interface, such as without requiring the agent or supervisor to access individual engagement pages or otherwise navigate away from the graphical user interface.

The engagement participation request processing tool 508 processes requests to participate in contact center engagements received from devices of contact center agents or supervisors. In particular, the initial agent (e.g., a human or non-human agent) which handles the contact center engagement may be considered a first contact center service operator, and the agent or supervisor which requests to participate in the contact center engagement may be considered a second contact center service operator.

A request to participate in a contact center engagement may, for example, be received based on an interaction with a user interface element corresponding to engagement participation from a device of a second contact center service operator. For example, the second contact center service operator may be a supervisor who receives an alert indicating that a sentiment-based score determined for an active engagement between a contact center user and a contact center agent has met or exceeded a threshold and accordingly interacts with a user interface element to transmit a request to participate in the engagement. In another example, the second contact center service operator may be a human agent who receives an alert indicating that a sentiment-based score determined for an active engagement between a contact center user and a non-human agent (e.g., a chatbot), such as while the user remains in queue or otherwise, meets or exceeds a threshold and accordingly interacts with a user interface element to transmit a request to participate in the engagement.

The engagement participation request processing tool 508 processes requests to participate in a contact center engagement including by establishing a contact center session involving a device of the contact center user and a device of the second contact center service operator. The second contact center service operator may thus participate in the contact center engagement over that established contact center session. The establishing of a contact center session may, for example, be performed as described above with respect to FIG. 4.

Although the tools 502 through 508 are shown as functionality of the session handling software 500 as a single piece of software, in some implementations, some or all of the tools 502 through 508 may exist outside of the session handling software 500 and/or a software platform configured to use the session handling software 500 (e.g., the software platform 300 shown in FIG. 3) may exclude the session handling software 500 while still including some or all of tools 502 through 508, individually or in combination, in some form elsewhere. In some implementations, the session handling software 500 may include tools other than or in addition to one or more of the tools 502 through 508.

Figure 6:
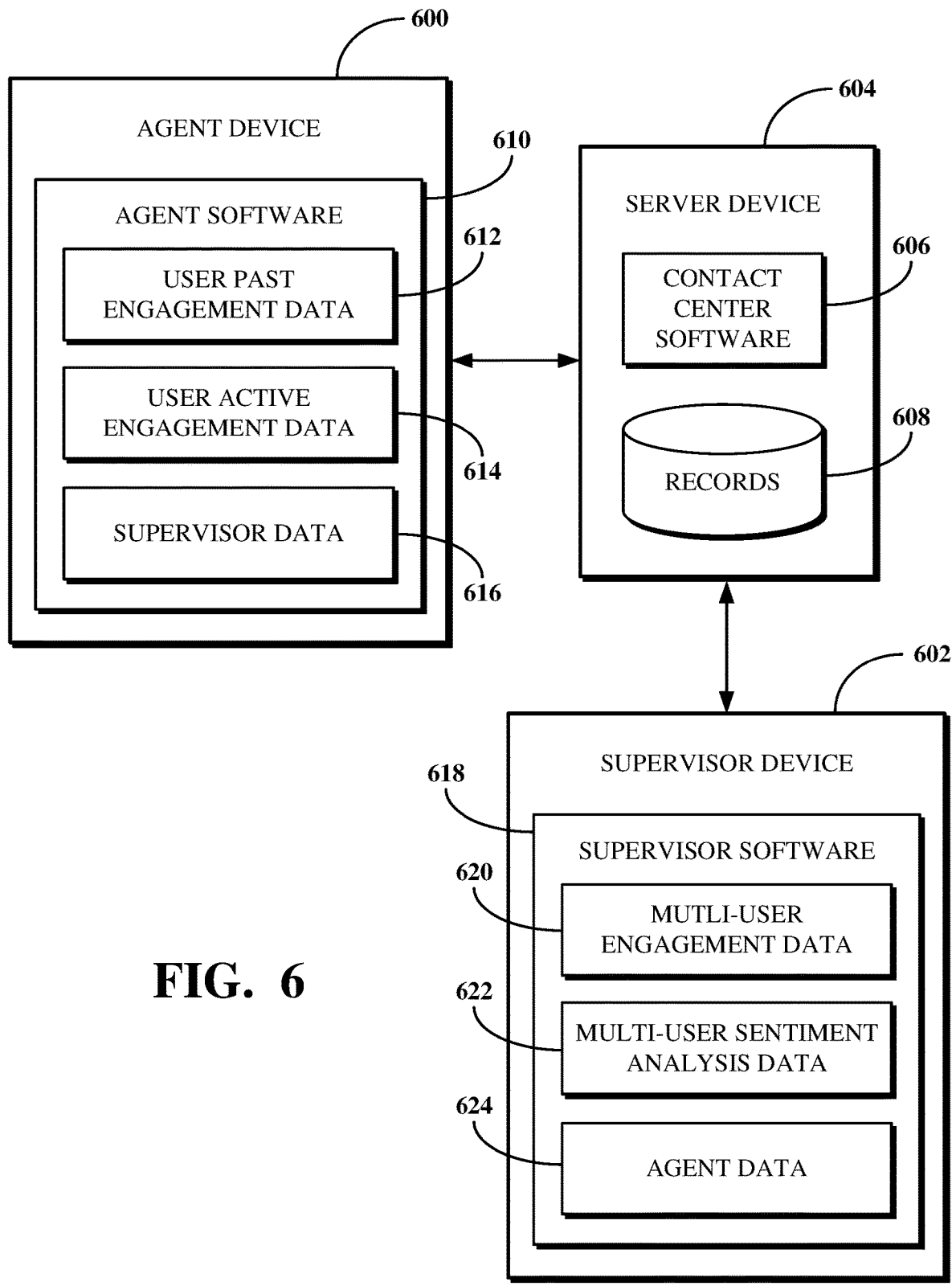
FIG. 6 is a block diagram of an example of agent and supervisor contact center system resources available during a contact center engagement.

FIG. 6 is a block diagram of an example of agent and supervisor contact center system resources available during a contact center engagement. The contact center system resources include an agent device 600 used by a contact center agent (e.g., the agent device 404 shown in FIG. 4), a supervisor device 602 used by a contact center supervisor of that agent, and a server device 604 in communication with the agent device 600 and the supervisor device. The server device 604 which runs software and stores data used to facilitate contact center engagements between contact center users and contact center agents, such as contact center software 606 and records within a data store 608.

The server device 604 may, for example, be a server used by a software platform, such as the software platform 300 shown in FIG. 3. For example, the server device 604 may the application server 108 and/or the database server 110 shown in FIG. 1. The contact center software 606 may, for example, be or include the software 406 through 410 shown in FIG. 4. The contact center software 606 may include the shown in FIGS. 4 and 5. The records within the data store 608 may correspond to one or more of contact center user data, contact center agent data, contact center supervisor data, contact center engagement data, contact center system data, or other data usable in connection with the contact center software 606.

The agent device 600 runs agent software 610, which may, for example, be implemented as or within a client application. In such a case, the agent device 600 may be one of the clients 304 through 310 shown in FIG. 3. Alternatively, the agent software 610 may, for example, be implemented as or within a non-client mobile application or web application. The agent software 610 is used to enable participation in contact center engagements with contact center users by the agent who is using the agent device 600.

In connection therewith, the agent software 610 accesses (e.g., from the data store 608 or otherwise) or otherwise obtains (e.g., from the contact center software 606 or otherwise) user past engagement data 612, user active engagement data 614, and supervisor data 616. For example, the data 612 through 616 may be output for display at the agent device 600 within one or more graphical user interfaces associated with the agent software 610. The user past engagement data 612 may be or include data representing one or more past contact center engagements for a contact center user with whom the agent using the agent device 600 is actively engaged in a contact center engagement. The user active engagement data 614 may be or include data representing that active contact center engagement with the contact center user. The supervisor data 616 may be or include data representing a supervisor or other second contact center service operator who may be able to request to participate in the active contact center engagement with the user (e.g., in which the agent using the agent device 600 is the first contact center service operator).

The supervisor device 602 runs supervisor software 618, which may, for example, be implemented as or within a client application. In such a case, the supervisor device 602 may be one of the clients 304 through 310 shown in FIG. 3. Alternatively, the supervisor software 618 may, for example, be implemented as or within a non-client mobile application or web application. The supervisor software 618 is used to enable the supervisor who is using the supervisor device 602 to view information associated with and request to participate in contact center engagements initially participated in by contact center agents (e.g., the agent using the agent device 600).

In connection therewith, the supervisor software 618 accesses (e.g., from the data store 608 or otherwise) or otherwise obtains (e.g., from the contact center software 606 or otherwise) multi-user engagement data 620, multi-user sentiment analysis data 622, and agent data 624. For example, the data 620 through 624 may be output for display at the supervisor device 602 within one or more graphical user interfaces associated with the supervisor software 618. The multi-user engagement data 620 may be or include data representing (e.g., and thus reported for) multiple active contact center engagements between contact center users and contact center agents (e.g., of an agent group) including an active contact center engagement involving the agent using the agent device 600. The multi-user sentiment analysis data 622 may be or include data representing sentiment-based scores determined for each of those active contact center engagements. The agent data 624 may be or include data representing an agent (e.g., as a first contact center service) initially participating in an active contact center engagement with the user, such as the agent using the agent device 600.

Figure 7:
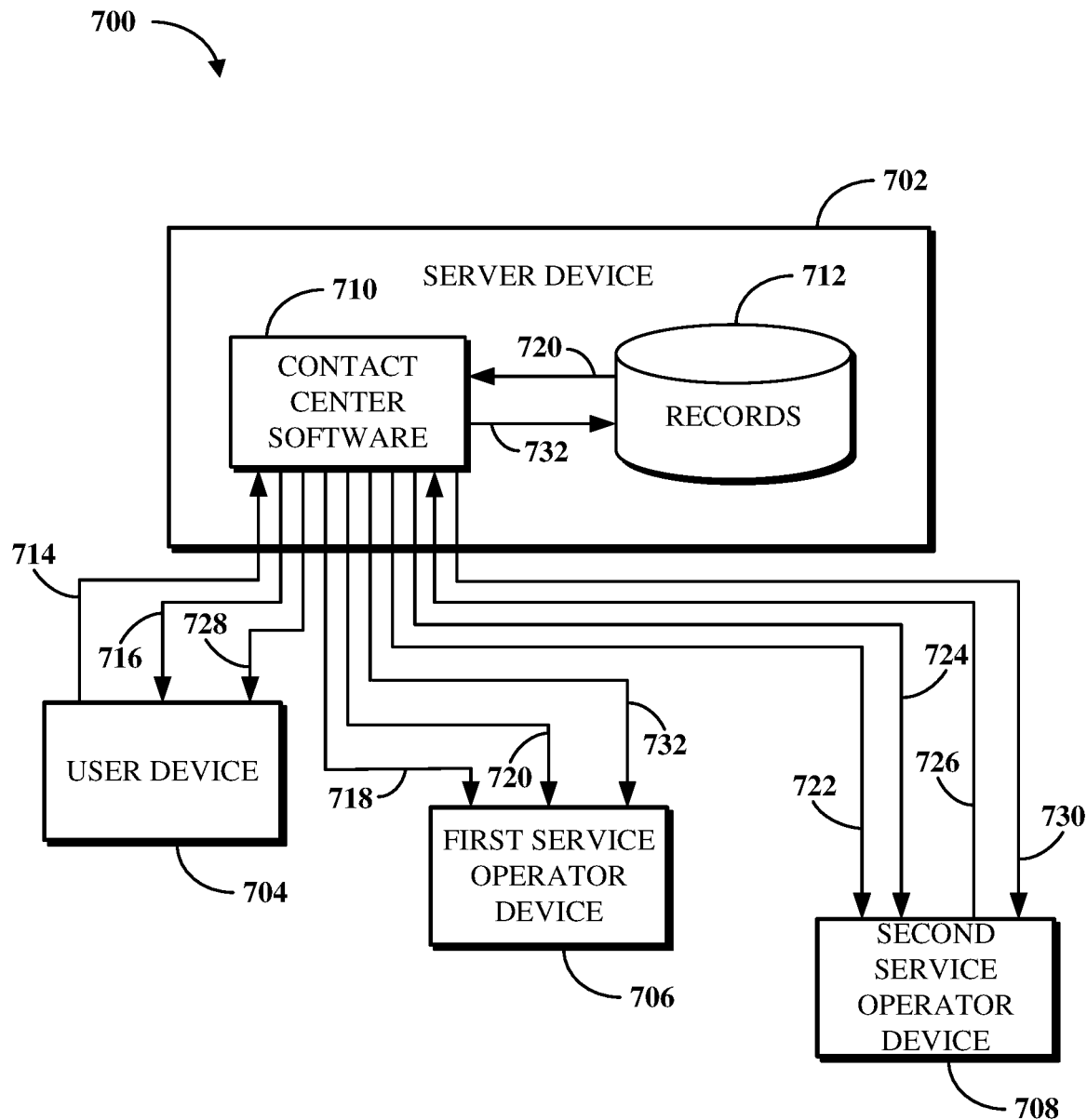
FIG. 7 is a block diagram of an example of a system for sentiment-based prioritization of contact center engagements.

FIG. 7 is a block diagram of an example of a system 700 for sentiment-based prioritization of contact center engagements. The system 700 includes a server device 702, a contact center user device 704, a first contact center service operator device 706, and a second contact center service operator device 708. The server device 702 may, for example, be the server device 604 shown in FIG. 4. The server device 702 includes contact center software 710 and a records data store 712, which may, for example, respectively be the contact center software 608 and the data store 610 shown in FIG. 6. The contact center user device 704 may, for example, be the user device 400 shown in FIG. 4. The first contact center service operator device 706 may, for example, be the agent device 600 shown in FIG. 6. The second contact center service operator device 708 may, for example, be the supervisor device 602 shown in FIG. 6.

The system 700 facilitates the sentiment-based prioritization of contact center engagements based on the processing of input to and output from the contact center software 710. In particular, the sentiment-based prioritization for a contact center engagement may begin with a request 714 for a contact center engagement being received at the contact center software 710 from the contact center user device 704. The contact center software 710 processes the request 714 to determine to route the request 714 to the first contact center service operator device 706. Routing the request 714 to the first contact center service operator device 706 may include establishing a contact center session involving the contact center user device 704 and the first contact center service operator device 706, such as by the contact center software 710 respectively transmitting data 716 and 718 configured to connect those devices to the established contact center session.

Based on the request 714, such as before or after the session is established between the contact center user device 704 and the first contact center service device 706, the contact center software 710 obtains data 720 associated with the user of the contact center user device 704 from the records data store 712 and transmits the data 720 to the first contact center service operator device 706 for use during the contact center engagement with the user of the contact center user device 704. For example, the data 720 may correspond to one or more past contact center engagements involving the user of the contact center user device 704. The contact center software 710 also, based on the request 714, transmits data 722 indicative of the contact center engagement to the second contact center service operator device 708. The data 722 may, for example, be data visually represented within a graphical user interface that displays information associated with multiple active contact center engagements.

The contact center software 710 determines a sentiment-based score for the contact center engagement between the user of the user device 704 and the agent using the first contact center service operator device 706 during the contact center engagement. The contact center software 710 transmits data 724 indicative of that sentiment-based score to the second contact center service operator device 708, for example, to cause the graphical user interface thereat to display the score and/or an alert associated with the score. At some point after the data 724 is received at the second contact center service operator device 708, a request 726 to participate in the contact center engagement is received from the second contact center service operator device 708. The contact center software 710 processes the request 726 to determine to establish a contact center session involving the contact center user device 704 and the second contact center service operator device 708.

Based on that determination, the contact center software 710 respectively transmitting data 728 and 730 configured to connect those devices to the established contact center session. In some cases, the contact center software 710 may also transmit information associated with the contact center engagement to the second contact center service operator device 708 based on the request 726. The agent or supervisor using the second contact center service operator device 708 may then participate in the contact center engagement over the contact center session established based on the data 728 and 730. At the end of the contact center engagement, or in some cases during or after the contact center engagement, the contact center software 710 may generate data 732 representative of the contact center engagement and store the data 732 in the records data store 712, such as for use with future contact center engagements involving the user of the contact center user device 704.

In some implementations, the request 726 may be omitted. For example, where the user of the first contact center service operator device 706 is a non-human agent (e.g., a chatbot) and the user of the second contact center service operator device 708 is a human agent or supervisor, the data 728 and 730 may automatically be transmitted by the contact center software 710 to the contact center user device 704 and the second contact center service operator device 708, respectively, upon a sentiment-based score determined for the contact center engagement meeting or exceeding a threshold. For example, the text within chat messages transmitted from the contact center user device 704 to the first contact center service operator device 706 may be processed to determine that a sentiment-based score for the contact center engagement between the user of the contact center user device 704 and the first contact center service operator device 706. Where that score meets or exceeds the threshold, indicating a requirement for another agent or supervisor to participate in the engagement, the contact center software 710 automates the transmission of the data 726 and 728. In some such implementations, because the first contact center service operator is a non-human, the first contact center service operator device 706 may be the server device 702 or another server device used with the system 700.

Figure 8:
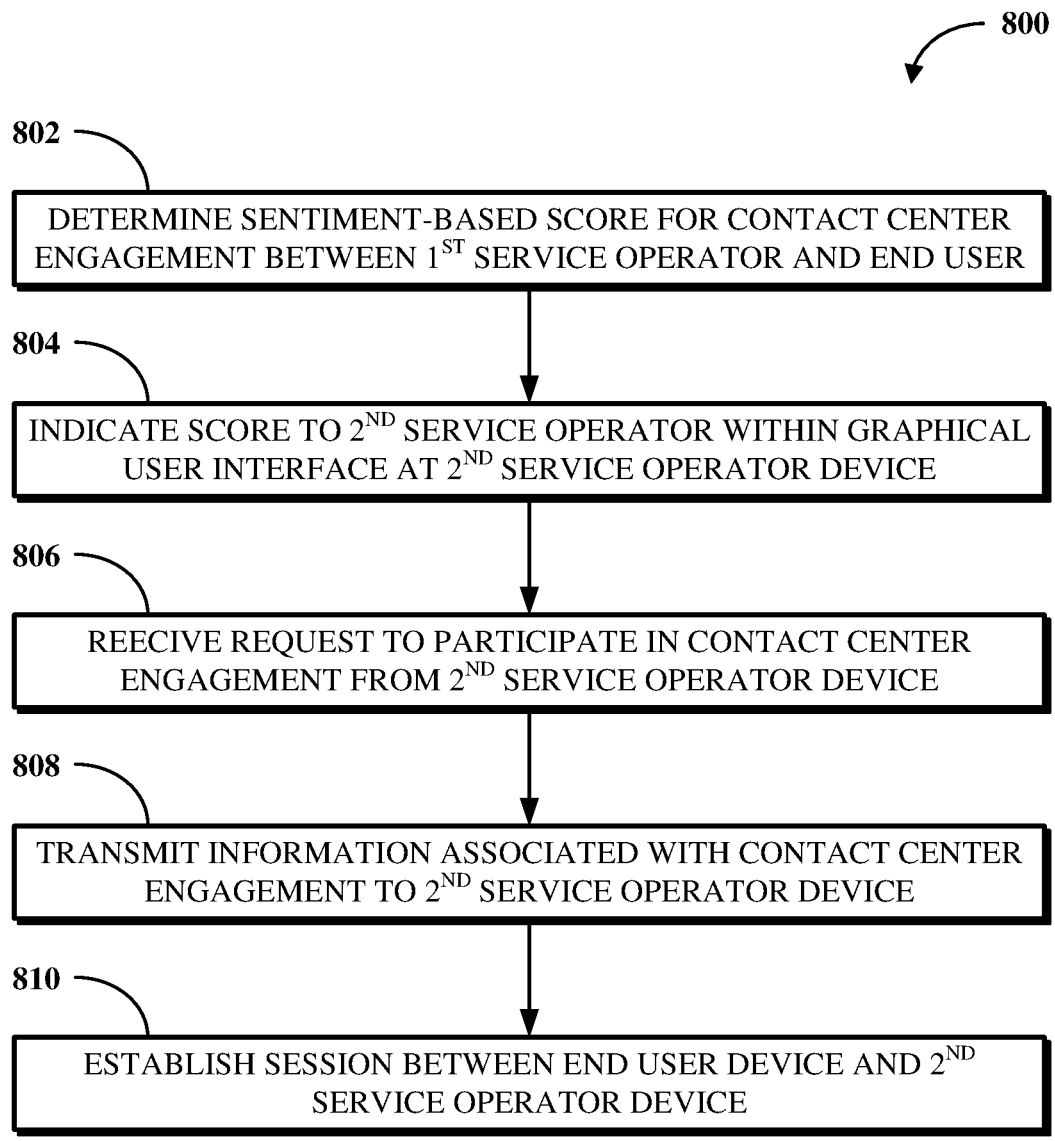
FIG. 8 is a flowchart of an example of a technique for sentiment-based prioritization of contact center engagements.

To further describe some implementations in greater detail, reference is next made to examples of techniques which may be performed by or using a system for sentiment-based prioritization of contact center engagements. FIG. 8 is a flowchart of an example of a technique for sentiment-based prioritization of contact center engagements. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a sentiment-based score is determined for a contact center engagement between a first contact center service operator and a contact center user. The contact center engagement may be initiated based on a request received from a device of the contact center user. The request for the contact center engagement may then be routed to a device of the first contact center service operator to initiate a conversation between the contact center user and the first contact center service operator. The sentiment-based score may be determined based on at least one of words, tones, inflections, phrases, pauses, speech volumes, or speech speeds from either of the contact center user to the first contact center service operator or from the first contact center service operator to the contact center user. The sentiment-based score may be determined at one or more times during the contact center engagement. In some cases, sentiment-based scores can be determined for some or all interactions during the contact center engagement. In some cases, the sentiment-based score may be updated for at least some interactions between the contact center user and the first contact center service operator during the contact center engagement. In some cases, an initial value for the sentiment-based score at a start of the contact center engagement may be based on data associated with a previous contact center engagement involving the contact center user.

At 804, the sentiment-based score is indicated to a second contact center service operator. In particular, the sentiment-based score may be indicated within a graphical user interface displaying information associated with multiple contact center engagements at a device of the second contact center service operator. For example, the information displayed within the graphical user interface may identify, for at least some of the multiple contact center engagements, a direction of communication, an identifier of the contact center user, an identifier of the first contact center service operator, an identifier of a queue which includes the contact center user, and an engagement start time. In some cases, indicating the sentiment-based score can include presenting an alert for the contact center engagement based on a comparison between the sentiment-based score and a threshold. For example, the alert may be presented using a user interface element displayed within the graphical user interface to alert the second contact center service operator as to a high priority of the contact center engagement based on the sentiment-based score. In some such cases, indicating the sentiment-based score can include comparing the sentiment-based score to a threshold to determine whether to present an alert associated with the contact center engagement within the graphical user interface. In some cases, the first contact center service operator is a contact center agent and the second contact center service operator is a contact center supervisor. In some cases, the first contact center service operator is a contact center chatbot and the second contact center service operator is one of a contact center agent or a contact center supervisor.

At 806, a request to participate in the contact center engagement is received from the device of the second contact center service operator. The request to participate in the contact center engagement is one of a request to monitor the contact center engagement, a request to communicate with the first contact center service operator during the contact center engagement, or a request to join the contact center engagement. The request may be received, via the graphical user interface output for display at that device. For example, the request may be received based on an interaction with an interactive user interface element of the graphical user interface. When the interactive user interface element corresponds to a first element, the request may be a request for the second contact center service operator to monitor the contact center engagement. When the interactive user interface element corresponds to a second element, the request is a request for the second contact center service operator to communicate with the first contact center service operator during the contact center engagement. When the interactive user interface element corresponds to a third element, the request is a request for the second contact center service operator to join the contact center engagement.

At 808, based on a request to participate in the contact center engagement, information associated with the contact center engagement is transmitted to the device of the second contact center service operator. For example, the information associated with the contact center engagement transmitted to the device of the second contact center service operator may include at least one of a summary of past contact center engagements involving the contact center user or a summary of the contact center engagement. In some cases, the information associated with the contact center engagement may be generated based on the request to participate in the contact center engagement. In some cases, the information associated with the contact center engagement may be accessed from a data store based on the request to participate in the contact center engagement.

At 810, based on a request to participate in the contact center engagement, a contact center session involving a device of the contact center user and the device of the second contact center service operator is established. In one example, where the request to participate in the contact center engagement is a request to monitor the contact center engagement and the contact center session is established to provide audio of the contact center engagement to the device of the second contact center service operator. In another example, where the request to participate in the contact center engagement is a request to communicate with the first contact center service operator and the contact center session is established to enable communications between a device of the first contact center service operator and the device of the second contact center service operator during the contact center engagement. In yet another example, where the request to participate in the contact center engagement is a request to join the contact center engagement and the contact center session is established to enable the second contact center service operator to communicate with the contact center user during the contact center engagement.

The implementations of this disclosure correspond to methods, non-transitory computer readable media, apparatuses, systems, devices, and the like. In some implementations, a method comprises determining a sentiment-based score for a contact center engagement between a first contact center service operator and a contact center user; indicating the sentiment-based score within a graphical user interface displaying information associated with multiple contact center engagements at a device of a second contact center service operator; and based on a request to participate in the contact center engagement received from the device of the second contact center service operator via the graphical user interface: transmitting information associated with the contact center engagement to the device of the second contact center service operator; and establishing a contact center session involving a device of the contact center user and the device of the second contact center service operator. In some implementations, a non-transitory computer readable medium stores instructions operable to cause one or more processors to perform operations comprising determining a sentiment-based score for a contact center engagement between a first contact center service operator and a contact center user; indicating the sentiment-based score within a graphical user interface displaying information associated with multiple contact center engagements at a device of a second contact center service operator; and based on a request to participate in the contact center engagement received from the device of the second contact center service operator via the graphical user interface: transmitting information associated with the contact center engagement to the device of the second contact center service operator; and establishing a contact center session involving a device of the contact center user and the device of the second contact center service operator. In some implementations, an apparatus comprises a memory and a processor configured to execute instructions stored in the memory to determine a sentiment-based score for a contact center engagement between a first contact center service operator and a contact center user; indicate the sentiment-based score within a graphical user interface displaying information associated with multiple contact center engagements at a device of a second contact center service operator; and based on a request to participate in the contact center engagement received from the device of the second contact center service operator via the graphical user interface: transmit information associated with the contact center engagement to the device of the second contact center service operator; and establish a contact center session involving a device of the contact center user and the device of the second contact center service operator.

In some implementations of the method, non-transitory computer readable medium, or apparatus, the sentiment-based score is updated for at least some interactions between the contact center user and the first contact center service operator during the contact center engagement.

In some implementations of the method, non-transitory computer readable medium, or apparatus, an initial value for the sentiment-based score at a start of the contact center engagement is based on data associated with a previous contact center engagement involving the contact center user.

In some implementations of the method, non-transitory computer readable medium, or apparatus, the request to participate in the contact center engagement is a request to monitor the contact center engagement and the contact center session is established to provide audio of the contact center engagement to the device of the second contact center service operator.

In some implementations of the method, non-transitory computer readable medium, or apparatus, the request to participate in the contact center engagement is a request to communicate with the first contact center service operator and the contact center session is established to enable communications between a device of the first contact center service operator and the device of the second contact center service operator during the contact center engagement.

In some implementations of the method, non-transitory computer readable medium, or apparatus, the request to participate in the contact center engagement is a request to join the contact center engagement and the contact center session is established to enable the second contact center service operator to communicate with the contact center user during the contact center engagement.

In some implementations of the method, non-transitory computer readable medium, or apparatus, indicating the sentiment-based score within the graphical user interface comprises presenting an alert for the contact center engagement based on a comparison between the sentiment-based score and a threshold.

In some implementations of the method, non-transitory computer readable medium, or apparatus, the information displayed within the graphical user interface identifies, for at least some of the multiple contact center engagements, a direction of communication, an identifier of the contact center user, an identifier of the first contact center service operator, an identifier of a queue which includes the contact center user, and an engagement start time.

In some implementations of the method, non-transitory computer readable medium, or apparatus, the first contact center service operator is a contact center agent and the second contact center service operator is a contact center supervisor.

In some implementations of the method, non-transitory computer readable medium, or apparatus, the first contact center service operator is a contact center chatbot and the second contact center service operator is one of a contact center agent or a contact center supervisor.

In some implementations of the method, non-transitory computer readable medium, or apparatus, indicating the sentiment-based score to the second contact center service operator comprises alerting, using a user interface element displayed within the graphical user interface, the second contact center service operator as to a high priority of the contact center engagement based on the sentiment-based score.

In some implementations of the method, non-transitory computer readable medium, or apparatus, the request to participate in the contact center engagement is one of a request to monitor the contact center engagement, a request to communicate with the first contact center service operator during the contact center engagement, or a request to join the contact center engagement.

In some implementations of the method, non-transitory computer readable medium, or apparatus, the information associated with the contact center engagement transmitted to the device of the second contact center service operator includes at least one of a summary of past contact center engagements involving the contact center user or a summary of the contact center engagement.

In some implementations of the method, non-transitory computer readable medium, or apparatus, the request is received based on an interaction with an interactive user interface element of the graphical user interface, wherein, when the interactive user interface element corresponds to a first element, the request is a request for the second contact center service operator to monitor the contact center engagement, wherein, when the interactive user interface element corresponds to a second element, the request is a request for the second contact center service operator to communicate with the first contact center service operator during the contact center engagement, and wherein, when the interactive user interface element corresponds to a third element, the request is a request for the second contact center service operator to join the contact center engagement.

In some implementations of the method, non-transitory computer readable medium, or apparatus, the sentiment-based score is determined based on at least one of words, tones, inflections, phrases, pauses, speech volumes, or speech speeds from either of the contact center user to the first contact center service operator or from the first contact center service operator to the contact center user.

In some implementations of the method, non-transitory computer readable medium, or apparatus, the sentiment-based score is determined at one or more times during the contact center engagement.

In some implementations of the method, non-transitory computer readable medium, or apparatus, the information associated with the contact center engagement is generated based on the request to participate in the contact center engagement.

In some implementations of the method, non-transitory computer readable medium, or apparatus, the sentiment-based score is compared to a threshold to determine whether to present an alert associated with the contact center engagement within the graphical user interface.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    initializing a sentiment-based score for a contact center engagement between a first contact center service operator and a contact center user based on data associated with a past contact center engagement involving the contact center user;
    updating the sentiment-based score during the contact center engagement based on one or more interactions between the first contact center service operator and the contact center user;
    indicating the sentiment-based score within a graphical user interface displaying information associated with multiple contact center engagements at a device of a second contact center service operator; and
    based on a request to participate in the contact center engagement received from the device of the second contact center service operator via the graphical user interface:
        transmitting information associated with the contact center engagement to the device of the second contact center service operator; and
        establishing a contact center session involving a device of the contact center user and the device of the second contact center service operator.

2. The method of claim 1, wherein the request to participate in the contact center engagement is a request to monitor the contact center engagement and the contact center session is established to provide audio of the contact center engagement to the device of the second contact center service operator.

3. The method of claim 1, wherein the request to participate in the contact center engagement is a request to communicate with the first contact center service operator and the contact center session is established to enable communications between a device of the first contact center service operator and the device of the second contact center service operator during the contact center engagement.

4. The method of claim 1, wherein the request to participate in the contact center engagement is a request to join the contact center engagement and the contact center session is established to enable the second contact center service operator to communicate with the contact center user during the contact center engagement.

5. The method of claim 1, wherein indicating the sentiment-based score within the graphical user interface comprises:
    presenting an alert for the contact center engagement based on a comparison between the sentiment-based score and a threshold.

6. The method of claim 1, wherein the information displayed within the graphical user interface identifies, for at least some of the multiple contact center engagements, a direction of communication, an identifier of the contact center user, an identifier of the first contact center service operator, an identifier of a queue which includes the contact center user, and an engagement start time.

7. The method of claim 1, wherein the first contact center service operator is a contact center agent and the second contact center service operator is a contact center supervisor.

8. The method of claim 1, wherein the first contact center service operator is a contact center chatbot and the second contact center service operator is one of a contact center agent or a contact center supervisor.

9. A non-transitory computer readable medium storing instructions operable to cause one or more processors to perform operations comprising:
    initializing a sentiment-based score for a contact center engagement between a first contact center service operator and a contact center user based on data associated with a past contact center engagement involving the contact center user;
    updating the sentiment-based score during the contact center engagement based on one or more interactions between the first contact center service operator and the contact center user;
    indicating the sentiment-based score within a graphical user interface displaying information associated with multiple contact center engagements at a device of a second contact center service operator; and based on a request to participate in the contact center engagement received from the device of the second contact center service operator via the graphical user interface:
transmitting information associated with the contact center engagement to the device of the second contact center service operator; and
establishing a contact center session involving a device of the contact center user and the device of the second contact center service operator.

10. The non-transitory computer readable medium of claim 9, indicating the sentiment-based score to the second contact center service operator comprises:
alerting, using a user interface element displayed within the graphical user interface, the second contact center service operator as to a high priority of the contact center engagement based on the sentiment-based score.

11. The non-transitory computer readable medium of claim 9, wherein the request to participate in the contact center engagement is one of a request to monitor the contact center engagement, a request to communicate with the first contact center service operator during the contact center engagement, or a request to join the contact center engagement.

12. The non-transitory computer readable medium of claim 9, wherein the information associated with the contact center engagement transmitted to the device of the second contact center service operator includes at least one of a summary of past contact center engagements involving the contact center user or a summary of the contact center engagement.

13. An apparatus, comprising:
a memory; and
a processor configured to execute instructions stored in the memory to:
initialize a sentiment-based score for a contact center engagement between a first contact center service operator and a contact center user based on data associated with a past contact center engagement involving the contact center user;
update the sentiment-based score during the contact center engagement based on one or more interactions between the first contact center service operator and the contact center user;
indicate the sentiment-based score within a graphical user interface displaying information associated with multiple contact center engagements at a device of a second contact center service operator; and
based on a request to participate in the contact center engagement received from the device of the second contact center service operator via the graphical user interface:
transmit information associated with the contact center engagement to the device of the second contact center service operator; and
establish a contact center session involving a device of the contact center user and the device of the second contact center service operator.

14. The apparatus of claim 13, wherein the request is received based on an interaction with an interactive user interface element of the graphical user interface,
wherein, when the interactive user interface element corresponds to a first element, the request is a request for the second contact center service operator to monitor the contact center engagement,
wherein, when the interactive user interface element corresponds to a second element, the request is a request for the second contact center service operator to communicate with the first contact center service operator during the contact center engagement, and
wherein, when the interactive user interface element corresponds to a third element, the request is a request for the second contact center service operator to join the contact center engagement.

15. The apparatus of claim 13, wherein the sentiment-based score is updated based on at least one of words, tones, inflections, phrases, pauses, speech volumes, or speech speeds from either of the contact center user to the first contact center service operator or from the first contact center service operator to the contact center user.

16. The apparatus of claim 13, wherein the sentiment-based score is updated at one or more times during the contact center engagement.

17. The apparatus of claim 13, wherein the processor is configured to execute the instructions to:
generate the information associated with the contact center engagement based on the request to participate in the contact center engagement.

18. The apparatus of claim 13, wherein the processor is configured to execute the instructions to:
compare the sentiment-based score to a threshold to determine whether to present an alert associated with the contact center engagement within the graphical user interface.

19. The apparatus of claim 13, wherein, to indicate the sentiment-based score to the second contact center service operator, the processor is configured to execute the instructions to:
alert a high priority of the contact center engagement to the second contact center service operator based on the sentiment-based score.

20. The apparatus of claim 13, wherein the first contact center service operator is one of a contact center agent or a chatbot.

* * * * *